May 15, 1928.  
F. W. B. ACHEN  
1,670,090  
VENTILATING APPARATUS FOR VEHICLE BODIES  
Filed May 19, 1926     2 Sheets-Sheet 1
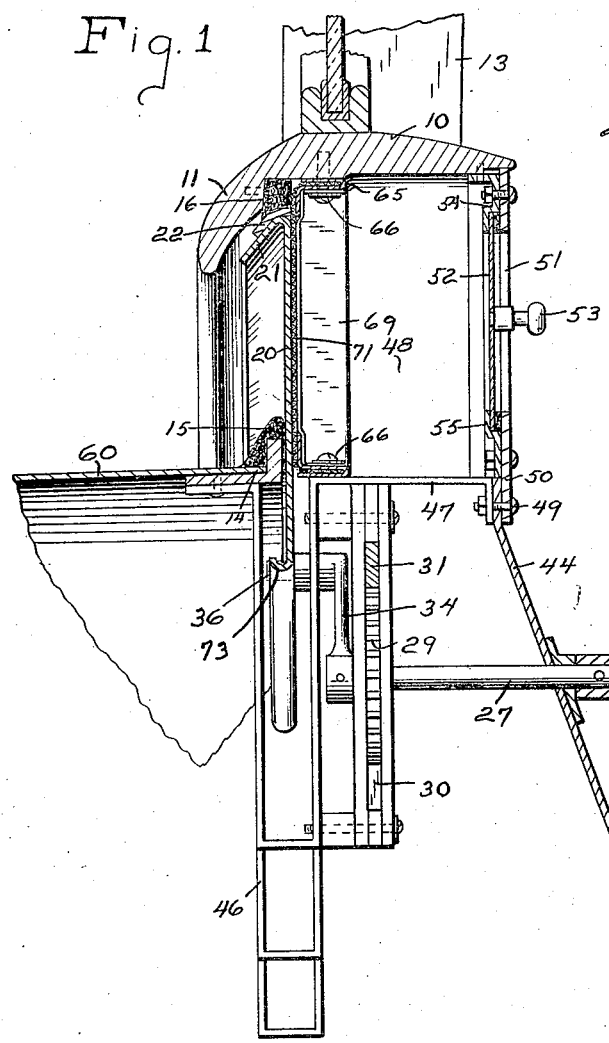
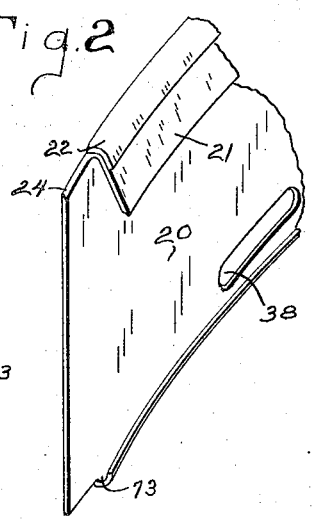
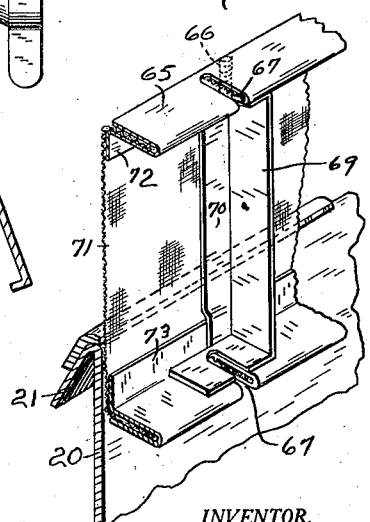
INVENTOR.  
Fred W. B. Achen  
BY  
Erwin, Wheeler & Woolard  
ATTORNEYS.

May 15, 1928.  
F. W. B. ACHEN  
1,670,090  
VENTILATING APPARATUS FOR VEHICLE BODIES  
Filed May 19, 1926 2 Sheets-Sheet 2
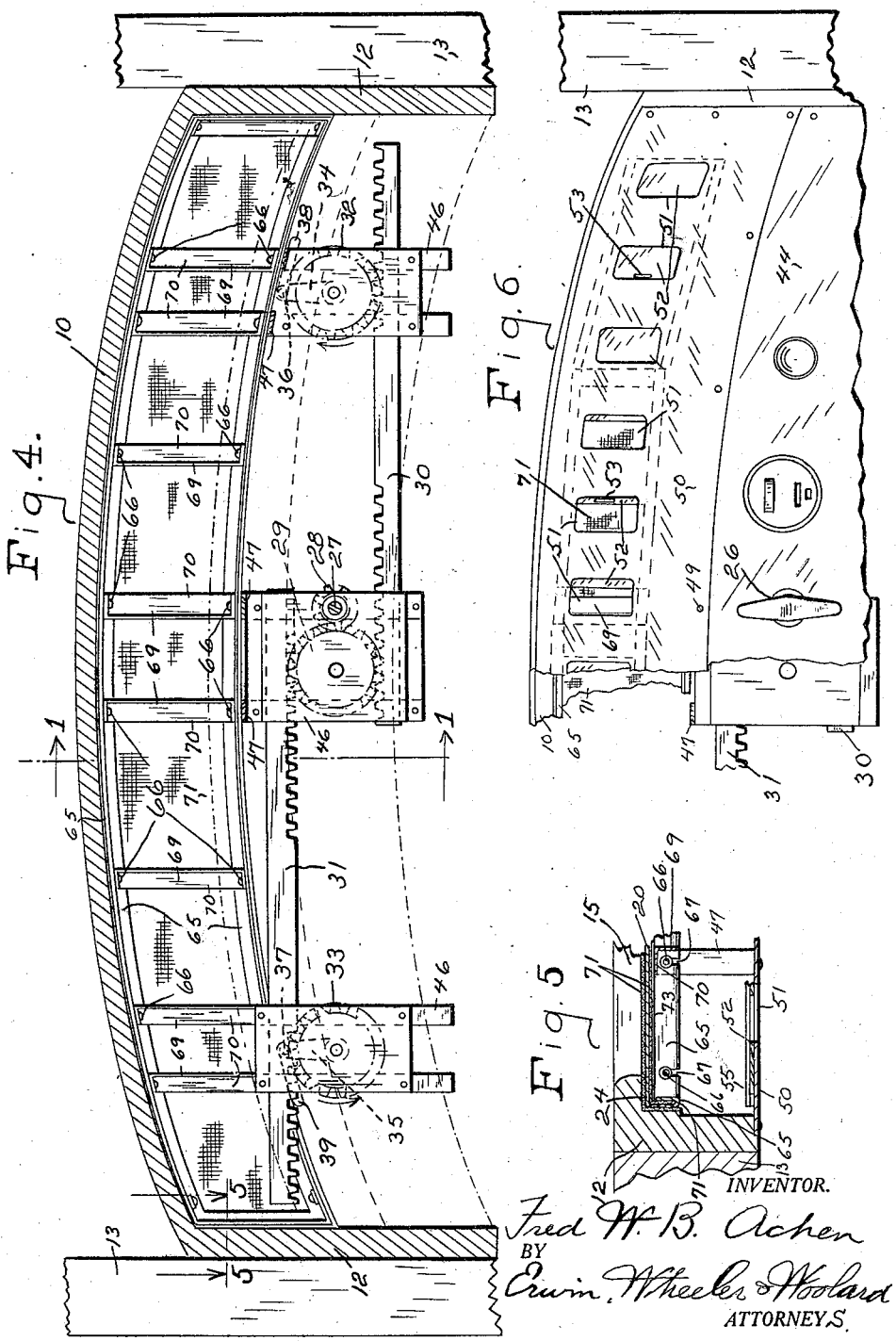

Patented May 15, 1928.

1,670,090

UNITED STATES PATENT OFFICE.

FRED W. B. ACHEN, OF KENOSHA, WISCONSIN.

VENTILATING APPARATUS FOR VEHICLE BODIES.

Application filed May 19, 1926. Serial No. 110,051.

My invention relates to improvements in ventilating apparatus for vehicle bodies.

Objects of this invention are to provide adequate ventilation for the closed bodies of motor driven vehicles independently of wind shield or window adjustments; to provide screened ventilating passages whereby insects, flying leaves, etc. may be excluded from the interior of the car body; to provide improved means for selectively directing the course of the air either downwardly toward the foot-board in front of the control board or directly rearwardly from the dash or from the space immediately above the cowl; to provide conveniently manipulated means for closing and opening the inlet of the ventilating passage and associated means for selectively directing the air; and, in general, to provide noiseless, satisfactory and adequate ventilating means which will permit the use of fixed on non-adjustable wind shields of adequate dimensions to permit free vision.

In the drawings:

Figure 1 is a sectional view drawn generally on line 1—1 of Figure 4, showing a fragment of a motor driven vehicle having a chambered ventilating dash constructed in accordance with my invention, the control board and a fragment of the cowl being shown in section on a plane longitudinal to the body of the car.

Figure 2 is an isometric view of a fragment of the main inlet valve or shutter as seen obliquely from the front.

Figure 3 is an isometric view of a fragment of the screen supporting frame and screen, showing also a fragment of the main damper or shutter in associated relation thereto.

Figure 4 is a rear elevation of the parts shown in Figure 3 with the main damper in closed position and showing also the operating mechanism, the housing walls being illustrated in section and fragments of the canopy supporting front posts being also shown.

Figure 5 is a fragmentary view in horizontal section on line 5—5 of Figure 4.

Figure 6 is a fragmentary view of the inner face of the dash and control board.

Like parts are identified by the same reference characters throughout the several views.

The movable parts of my improved ventilating apparatus, with the exception of the operating pieces or handles, are housed within a chambered dash member and the space between the control board and the rear wall of the engine chamber. The chambered dash member has a cap plate 10 having a forwardly and downwardly curved skirting 11 and end plates 12 (Figures 4 and 5) which may be secured to the canopy supporting posts 13 against which they bear, as clearly shown in said Figures 4 and 5.

The term "dash member", as herein used, is to be understood as applying to the portion of the front wall of the vehicle body below the glass wind shield, and particularly to the portion which projects above the cowl. In the embodiment of my invention herein disclosed, this dash member is constructed in the form of a ventilating chamber provided with means for screening and controlling the air flowing therethrough.

A bottom wall 14 of the dash member is provided underneath the overhanging skirting 11 and this wall has an upturned portion which supports a non-metallic cushion 15, preferably of rubber. Another cushion 16 is secured to the under surface of the skirting 11 near its junction with the plate 10, and preferably directly above the cushion 15.

A main valve or slide 20 has its upper margin provided with a forwardly and downwardly inclined flange 21, preferably capped by a reinforcing bearing piece 22 which is adapted for contact with the cushion 16 when the slide 20 is closed. When the slide is fully open this flange is brought into engagement with the cushion 15, the front surface of which is inclined to substantially fit the under surface of the flange 21, whereby in either the open or closed position independent vibration or rattling of the slide will be prevented.

The end margins 24 of the slide are fitted to suitable grooves or channels in the end walls 12 of the housing, whereby the slide is guided in its vertical movements. The slide is actuated from a suitable handle 26, located in front of the instrument, (or control) board and adapted to transmit motion to the slide through the shaft 27, pinion 28, gear wheel 29, rack bars 30 and 31, (Figure 4), gear wheels 32 and 33, crank arms 34 and 35, and crank pins 36 and 37, the latter being loosely engaged in obliquely disposed slots 38 and 39, respectively, in the lower marginal portion of the slide 20.

It is expected that the slide will ordinarily be adjusted in either the full open or full closed position, although this is not essential. In the full closed position, the crank pins will be at the inner ends of their respective slots 38 and 39 and the crank arms will occupy substantially a vertical position, with the pins bearing against the upper margins of the slots and forcibly pressing the slide against the upper cushion 16. When the crank arms are swung downwardly to adjust the slide to the full open position the crank pins will again be at the inner ends of the slots, but will bear forcibly against the lower margins of the slots to draw the slide flange 21 forcibly against the rubber cushion 15. The movement of the slide will of course be comparatively slow as the cranks approach either of their vertical positions, and the inclination of the slots will cause additional retardation and allow the crank pins to move with a wedging action upon the slot margins, whereby considerable pressure may be exerted upon the engaged cushion without developing excessive resistance at the operating handle 26.

It will be observed that the slide actuating connections above described are supported by the control board or instrument board 44 and by a depending frame 46 connected with the dash member. One portion of this frame is secured to the base or bottom wall 14 of the dash member, whereas another portion is provided with arms 47 at suitable intervals which span the central cavity 48, as clearly shown in Figure 1, and are secured to the upper marginal portion of the instrument board by bolts 49 which also connect the inner wall 50 of the dash member to said instrument board.

The inner wall 50 of the dash member is provided with a series of apertures 51 which may be closed by slides or shutters 52 operatively connected with actuating knobs 53. Preferably a plurality of shutters 52 may be connected for simultaneous operation by means of a single knob 53, or each shutter may be of such length as to close a plurality of apertures 51. Each of the shutters is guided by upper and lower brackets 54 and 55, respectively, said brackets being connected with the inner wall 50 of the dash. When the shutters are adjusted to uncover the openings 51, air from above the cowl 60 (Figure 1) may pass directly through the dash to the interior of the vehicle body, if the slide 20 is also open, although a portion of the air will ordinarily be turned downwardly in the cavity 48 and will pass toward the floor underneath the instrument or control board 44. As the shutters 52 are progressively moved toward closed position by the knobs 53, an increasing portion of the air will be compelled to pass downwardly toward the floor of the body and all of the air will so pass when the shutters 52 are fully closed. By employing a plurality of shutters, it will also be possible to completely close some of the openings 51 while leaving others wholly or partially open. The wishes of the individual passengers may therefore be generally complied with.

To prevent leaves and insects from entering the car through the ventilation openings, a screen supporting frame 65 is adjusted within the housing and secured to the plate 10 and frame bar 47 by bolts 66 as shown in Figures 1 and 4. These bolts pass through slots 67 (Figure 3) in the upper and lower bars of the screen supporting frame, whereby said frame may be adjusted to the front or rear and then clamped in position by the bolts. These upper and lower bars are connected at frequent intervals by flanged posts or vertical bars 69, the flanges 70 of which form bearings for the screen 71 in co-operation with flanges 72 and 73 on the upper and lower bars of the frame respectively. The screen 71 is therefore adequately supported and if tightly stretched, it will maintain its position in a vertical plane through long periods of use. This is important for the reason that the main valve or slide 20 moves along the surface of this screen and its reinforcing plate 22 is effective to scrape leaves and insects from the screen whenever the valve is moved toward closing position. The upper and lower members of the screen supporting frame are preferably formed of sheet metal strips, each longitudinally folded upon itself and engaging the upper and lower margins of the screen between the folded portions, whereby the screen may be securely anchored.

In Figures 1 and 2, it will be observed that the lower margin of the valve or slide 20 is provided with a forwardly projecting trough 73. The purpose of this trough is to gather any water that may follow the valve 20 downwardly past the cushion 15 during a rain storm. This trough directs the water laterally toward the sides of the car where it may be delivered at any suitable point.

From the drawings, taken with the foregoing description, it will be obvious that adequate ventilation of a closed car body can be obtained without disturbing the glass of the wind shield and such glass may therefore be permanently and immovably secured in position.

I claim:

1. In a vehicle, a chambered dash having its walls apertured at the front and provided with non-metallic cushions at the top and bottom of such aperture, a slide valve for closing said aperture, having a flanged upper margin adapted for abutting contact with the upper cushion when the valve is closed and also adapted to partially embrace the lower cushion when the valve is open.

2. In a vehicle, a chambered dash having its walls apertured at the front and provided with non-metallic cushions at the top and bottom of such aperture, a slide valve for closing said aperture, having a flanged upper margin adapted for abutting contact with the upper cushion when the valve is closed and also adapted to partially embrace the lower cushion when the valve is open, and a manually operable handle provided with actuating connections for transmitting motion to the valve.

3. A ventilating valve mechanism for vehicle bodies, including a vertically movable slide valve provided with slots in its lower marginal portions, a set of cranks having crank pins loosely engaged in said slots, and means for manually actuating said cranks simultaneously.

4. A ventilating dash for vehicle bodies, provided with an air inlet communicating with a receiving chamber, a slide valve for closing said air inlet, cushions against which the upper margin of said valve is adapted to seat in either its open or closed position, and manually operable crank mechanism for actuating said valve.

5. A ventilating dash for vehicle bodies, provided with an air inlet communicating with a receiving chamber, a slide valve for closing said air inlet, cushions against which the upper margin of said valve is adapted to seat in either its open or closed position, and manually operable crank mechanism for actuating said valve, together with means for directing air from the receiving chamber selectively in two directions.

6. A ventilating dash for vehicle bodies, provided with an air inlet communicating with a receiving chamber, a slide valve for closing said air inlet, cushions against which the upper margin of said valve is adapted to seat in either its open or closed position, manually operable crank mechanism for actuating said valve, together with means for directing air from the receiving chamber selectively in two directions, and a screen in the path of the air received through said chambered dash.

7. A ventilating dash for vehicle bodies, provided with an air inlet communicating with a receiving chamber, a slide valve for closing said air inlet, cushions against which the upper margin of said valve is adapted to seat in either its open or closed position, manually operable crank mechanism for actuating said valve, together with means for directing air from the receiving chamber selectively in two directions, and a screen in the path of the air received through said chamber, said screen being adjustable for contact therewith by the upper margin of the inlet valve when the latter is being adjusted.

8. A chambered air inlet member for vehicle bodies, provided with a slide valve having oppositely inclined slots in its lower portion, a set of cranks each having a crank pin engaged in one of said slots and adapted by rotation to open or close said valve, said cranks being disposed to hold the valve rigidly in closed position when upwardly extended and to rigidly hold the valve in open position when downwardly extended, said air inlet member being provided with resilient cushions for contact with the valve in its open and closed positions.

9. A chambered air inlet member for vehicle bodies, provided with front and rear valved apertures and an open bottom portion, independently adjustable valves controlling the flow of air through said apertures, and manually operable means for separately actuating said valves.

10. The combination with the wind shield and instrument board of a motor driven vehicle, of an interposed ventilating chamber having a valved air inlet and an open bottom permitting flow of air downwardly through the space in front of the instrument board, manual means for adjusting said valve to open and closed positions, and resilient cushions adapted to be impinged by said valve in either the open or closed position to prevent rattling.

11. The combination with the wind shield and instrument board of a motor driven vehicle, of an interposed ventilating chamber having a valved air inlet and an open bottom permitting flow of air downwardly through the space in front of the instrument board, manual means for adjusting said valve to open and closed positions, resilient cushions adapted to be impinged by said valve in either the open or closed position to prevent rattling, and a screen supporting frame adjustably mounted in said ventilating chamber in the path of the air passing therethrough.

12. The combination with the wind shield and instrument board of a motor driven vehicle, of an interposed ventilating chamber having a valved air inlet and an open bottom permitting flow of air downwardly through the space in front of the instrument board, manual means for adjusting said valve to open and closed positions, and resilient cushions adapted to be impinged by said valve in either the open or closed position to prevent rattling, a screen supporting frame adjustably mounted in said ventilating chamber in the path of the air passing therethrough, said ventilating chamber being also provided with valved apertures in its rear wall adapted, when open, to permit a direct passage of air to the body of the car above the instrument board.

13. A ventilating slide for motor driven vehicles, having an upper marginal seating portion and a lower portion provided with oppositely inclined slots, in combination with a chambered ventilating member provided with upper and lower resilient cushions to be engaged by said marginal seating member, a set of cranks having crank pins engaged in said slots, and means for actuating said cranks to upwardly and downwardly extending positions to move the slide to closed and open positions, the final movement of said slide toward either position being retarded by reason of the direction in which the cranks move and also by reason of the inclination of the slots.

14. In a vehicle, the combination with a chambered dash having an opening in its front wall above the cowl, of a slide valve for said opening adapted to move downwardly to open position, and a packing bearing upon the front face of the valve along the lower margin of said opening, said packing being adapted to prevent rattling vibrations of the valve and to also prevent water from entering the chamber along the valve.

15. In a vehicle, a chambered dash having a cap plate provided with a forwardly and downwardly inclined skirt and having an opening in its front wall underneath the cap plate, a valve for said opening provided with a drain trough along its lower margin, and water excluding packings along the margins of said opening.

16. The combination with the cowl of a vehicle, a plate upwardly spaced therefrom, and a windshield above said plate, of a slide valve vertically adjustable to control the opening between said cowl and said plate below said windshield, and mechanism below said cowl for the adjustment of said valve.

17. The combination with a vehicle cowl and a cap plate upwardly spaced therefrom, of a valve for the opening between said cowl and plate, said valve being slidable between an upper position in which said opening is closed to a minimum and a lower position in which said opening reaches a maximum, together with operating mechanism for said valve connected therewith below said opening, whereby said mechanism at no time spans said opening.

FRED W. B. ACHEN.